(12) United States Patent
Folk et al.

(10) Patent No.: US 9,398,445 B2
(45) Date of Patent: Jul. 19, 2016

(54) CELLULAR NETWORK COMMUNICATION BETWEEN ASSETS AND A CENTRAL SERVER

(71) Applicant: IntraGrain Technologies Inc., Regina (CA)

(72) Inventors: Kyle Ronald Folk, Regina (CA); Joseph Mervin Toth, Regina (CA)

(73) Assignee: INTRAGRAIN TECHNOLOGIES INC., Regina, Saskatchewan (CA)

( * ) Notice: Subject to any disclaimer, the term of this patent is extended or adjusted under 35 U.S.C. 154(b) by 10 days.

(21) Appl. No.: 14/305,152

(22) Filed: Jun. 16, 2014

(65) Prior Publication Data

US 2015/0080001 A1     Mar. 19, 2015

Related U.S. Application Data

(60) Provisional application No. 61/836,287, filed on Jun. 18, 2013.

(51) Int. Cl.
    *H04W 8/26*     (2009.01)
    *H04W 4/00*     (2009.01)
    *H04W 24/08*     (2009.01)

(52) U.S. Cl.
    CPC ............... *H04W 8/26* (2013.01); *H04W 4/005* (2013.01); *H04W 24/08* (2013.01)

(58) Field of Classification Search
None
See application file for complete search history.

(56) References Cited

U.S. PATENT DOCUMENTS

| 2011/0110255 | A1* | 5/2011 | Park | H04B 17/382 370/252 |
| 2011/0195792 | A1* | 8/2011 | Wells | G07F 9/026 463/43 |
| 2012/0214488 | A1* | 8/2012 | Busropan | H04W 4/005 455/435.1 |
| 2012/0214520 | A1* | 8/2012 | Bergqvist | H04W 68/02 455/458 |

* cited by examiner

*Primary Examiner* — Daniel Lai
(74) *Attorney, Agent, or Firm* — Ryan W. Dupuis; Kyle R. Satterthwaite; Ade & Company Inc.

(57) ABSTRACT

In a method of communicating between a central server and a plurality of assets over a cellular network in communication with the central server, each asset has a transceiver arranged to communicate with the cellular network which includes an integrated circuit card identifier (ICCID) and an international mobile subscriber identity (IMSI). The ICCID of each transceiver is unique, but the IMSI of multiple transceivers are identical to one another. Communication between the assets and the central server is initiated by the asset transceivers and is rescheduled automatically in the event that another transceiver with the same IMSI is already communicating with the central server. Communication from the server to the asset transceivers involves queuing data until the transceiver of the intended recipient transceiver contacts the central server.

17 Claims, 2 Drawing Sheets

CELLULAR NETWORK COMMUNICATION BETWEEN ASSETS AND A CENTRAL SERVER

This application claims the benefit under 35 U.S.C. 119(e) of U.S. provisional application Ser. No. 61/836,287, filed Jun. 18, 2013.

FIELD OF THE INVENTION

The present invention relates to a system and method of communication between a plurality of assets equipped with cellular transceivers and a central server over a cellular network in which at least some of the transceivers have international mobile subscriber identities in common with one another.

BACKGROUND

In many fields, it is desirable for various assets at remote locations to be monitored by a central server. In the field of agriculture for example, it is common to monitor assets such as grains stored in storage bins to ensure that the grain does not reach undesirable temperatures which can cause spoilage of the grain, resulting in diminished quality or full spoilage of the grain.

Some communication systems for monitoring applications are known to employ cellular transceivers for communication with the central server over a cellular network. Where multiple assets are in relatively close proximity to one another, a local network may be used to aggregate monitoring for communication to the central server using a common cellular transceiver. When assets are spaced apart at great distances and at different sites which are remote from one another, typically multiple cellular transceivers are required for respective communication to the central server.

Cellular transceivers typically have a Subscriber Identity Mobile (SIM) card installed therein which stores an International Mobile Subscriber Identity (IMSI) that defines the 10 digit Mobile Subscription Identification Number commonly known as the phone number of the transceiver thereon. The SIM card also stores thereon a unique SIM Serial Number (SSN) which is also known as an International Circuit Card Identifier (ICCID). Under current cellular networks, a unique IMSI is assigned to each device communicating with the network as this unique number is relied on to ensure the correct device responds when placing calls.

As the popularity of automated devices which communicate over cellular networks continues to increase in many fields, there is a concern for a shortage of devices which will be able communicate with the cellular network in view of the finite quantity of unique IMSI's available under the current cellular network configurations. There is a need therefore for more efficient use of the finite number of IMSI's, but in a manner which does not result in interference between devices communicating on the network and without relying on local area networks between multiple assets which may be at great distance from one another.

SUMMARY OF THE INVENTION

According to one aspect of the present invention there is provided a method of communicating between a central server and a plurality of assets over a cellular network in communication with the central server, the method comprising:

i) providing each asset with a transceiver arranged to communicate with the cellular network in which each transceiver includes an integrated circuit card identifier and an international mobile subscriber identity such that:
 a) the integrated circuit card identifier of each transceiver is unique; and
 b) the international mobile subscriber identity of at least two transceivers are in common with one another; and
ii) initiating communication between said at least one of the assets and the central server over the cellular network using the transceiver of at least one of the assets.

In some instances, when each transceiver is provided with a unique transceiver identification, the method may further include identifying the transceiver with the central server using the unique transceiver identification upon successful connection between said at least one of the assets and the central server over the cellular network. Alternatively, the transceiver may be identified with the central server using the unique integrated circuit card identifier of the transceiver upon successful connection between said at least one of the assets and the central server over the cellular network.

Preferably the transceiver is used to periodically sample data associated with the asset and subsequently initiate communication with the central server.

Alternatively, communicating data from the central server to the transceiver of one of the assets is preferably accomplished by i) queuing said data at the central server until communication between the transceiver of said one of the assets with the central server is initiated by the transceiver, and ii) sending said data to said one of the assets once the unique integrated circuit card identifier of the transceiver has been verified.

By providing more than one transceiver using the same IMSI, but with a unique ICCID, more devices can communicate with existing cellular network configurations despite a finite set of IMSI's being available, while still allowing for individual identification of devices on the network. Furthermore, by always initiating communication from the transceiver, problems associated with connecting the server to the wrong device among plural devices with the same IMSI can be prevented. By further arranging regular periodic communication initiated from the devices to the server together with subsequent identification of the device with the server by means other than the IMSI, queued data from server can be communicated to the device also.

According to a second aspect of the present invention there is provided a communication system for communicating with a plurality of assets over a cellular network, the system comprising:

a central server in communication with the cellular network;

a cellular transceiver associated with each asset and arranged to communicate between the asset and the central server over the cellular network, each cellular transceiver having an integrated circuit card identifier and an international mobile subscriber identity;

the integrated circuit card identifier of each transceiver being unique;

the international mobile subscriber identity of at least two transceivers being identical to one another.

Preferably the central server includes i) a memory having a unique asset identifier stored thereon in association with each asset, and ii) a processor programmed to identify each transceiver according to either one of the integrated circuit card identifier of said transceiver or the asset identifier of the asset associated with said transceiver upon a successful connection between said transceiver and the central server over the cellular network initiated by said transceiver.

Preferably the central server comprises a memory and programming stored thereon so as to be arranged to identify the transceiver with the central server using the unique integrated circuit card identifier of the transceiver upon successful connection between said at least one of the assets and the central server over the cellular network.

The programming stored on the memory is preferably further arranged to reschedule a subsequent attempt to initiate communication between said at least one of the assets and the central server over the cellular network in response to a failed connection resulting from the transceiver of another one of the assets having the same international mobile subscriber identities already being in communication over the cellular network.

The programming stored on the memory is preferably further arranged, in response to a successful connection of said at least one of the assets with the central server over the cellular network, to store a connection time slot associated with the successful connection in a memory of the transceiver of said at least one of the assets for use in scheduling subsequent attempts to communicate with the central server over the cellular network.

Preferably the programming stored on the memory is further arranged to communicate data from the central server to the transceiver of one of the assets by i) queuing said data at the central server until communication between the transceiver of said one of the assets with the central server is initiated by the transceiver, and ii) sending said data to said one of the assets once the unique integrated circuit card identifier of the transceiver has been verified.

The programming stored on the memory is preferably further arranged to use the transceiver to periodically sample data associated with the asset, to compare the sampled data with notification criterion, and to use the transceiver to initiate communication with the central server in response to the notification criterion being met.

The programming stored on the memory is preferably further arranged to use the transceiver to initiate communication with the central server in response to a prescribed number of sampling cycles in which the sampled data does not meet the notification criterion.

The international mobile subscriber identity of all of the transceivers may be identical to one another.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
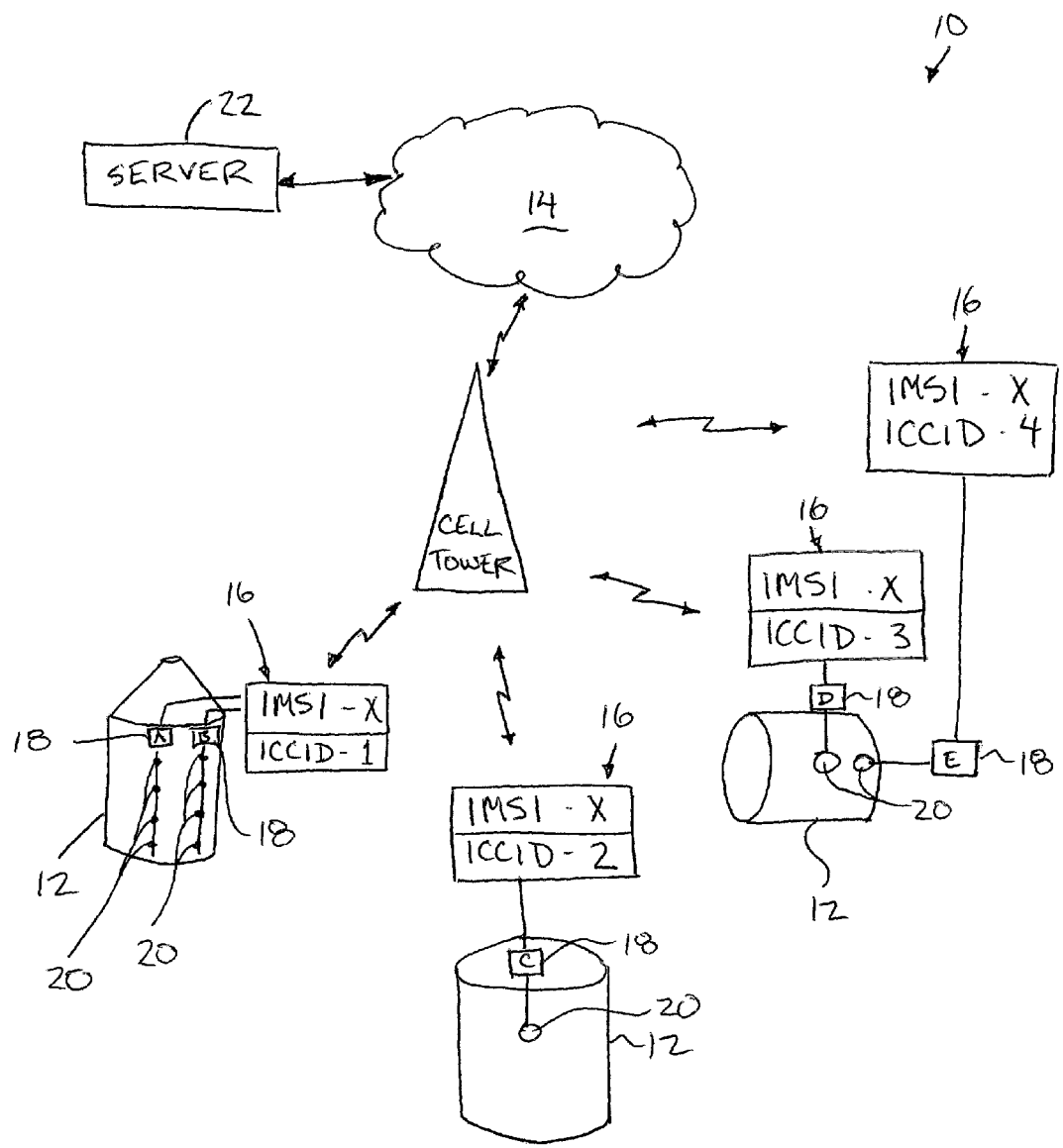
FIG. 1 is schematic representation of the communication system according to the present invention.

Referring to the accompanying figures, there is illustrated a communication system generally indicated by reference numeral 10. The system 10 is suitable for communication of a plurality of assets 12 over a cellular network 14.

The system 10 generally includes one or more controllers 16 associated with each asset. In the illustrated embodiment, the system relates to a monitoring application in which each controller includes one or more sensors 18 associated with the asset which measures or senses a condition or attribute of the asset, for example temperature or humidity in the instances of monitoring grain in an asset such as a grain bin.

Each sensor 18 may include only a single sensing element 20 or an array of sensing elements 20 which are in turn reported to the controller 16. The sensors may communicate with the respective controllers by various means including wired or wireless communications in various forms. In each instance each sensor, or each sensor element typically includes a unique sensor identification.

Each controller 16 is generally in the form of a cellular transceiver which includes a memory storage and a processor for executing various functions according to programming stored on the memory. Each controller further stores in the memory a unique transceiver identification associated with the hardware to identify the hardware.

In addition, each transceiver includes a Subscriber Identity Module installed thereon, known as a SIM card. The SIM card has an International Mobile Subscriber Identity, IMSI, stored thereon which defines the 10 digit phone number known as the Mobile Subscription Identification Number as part of the IMSI. The SIM card further stores thereon a SIM serial number also referred to as an International Circuit Card Identifier, or ICCID. Each transceiver of the system 10 is associated with a unique ICCID. The IMSI of the transceivers however are all arranged to be identical to one another such that they have the same 10 digit phone number associated therewith.

The system 10 further includes a central server 22 which also includes a memory for storing programming thereon and a processor for executing various functions according to the program as described below. The central server also stores thereon the sensor identifications together with their associated transceiver identification, asset identification and both the ICCID and IMSI of the respective transceiver. The central server 22 is also connected to the cellular network 14 for communication therewith by any suitable means. The central server may comprise a single computer or a group of interconnected computers at one location or distributed across a plurality of locations interconnected by a suitable network, for example the internet.

Figure 2:
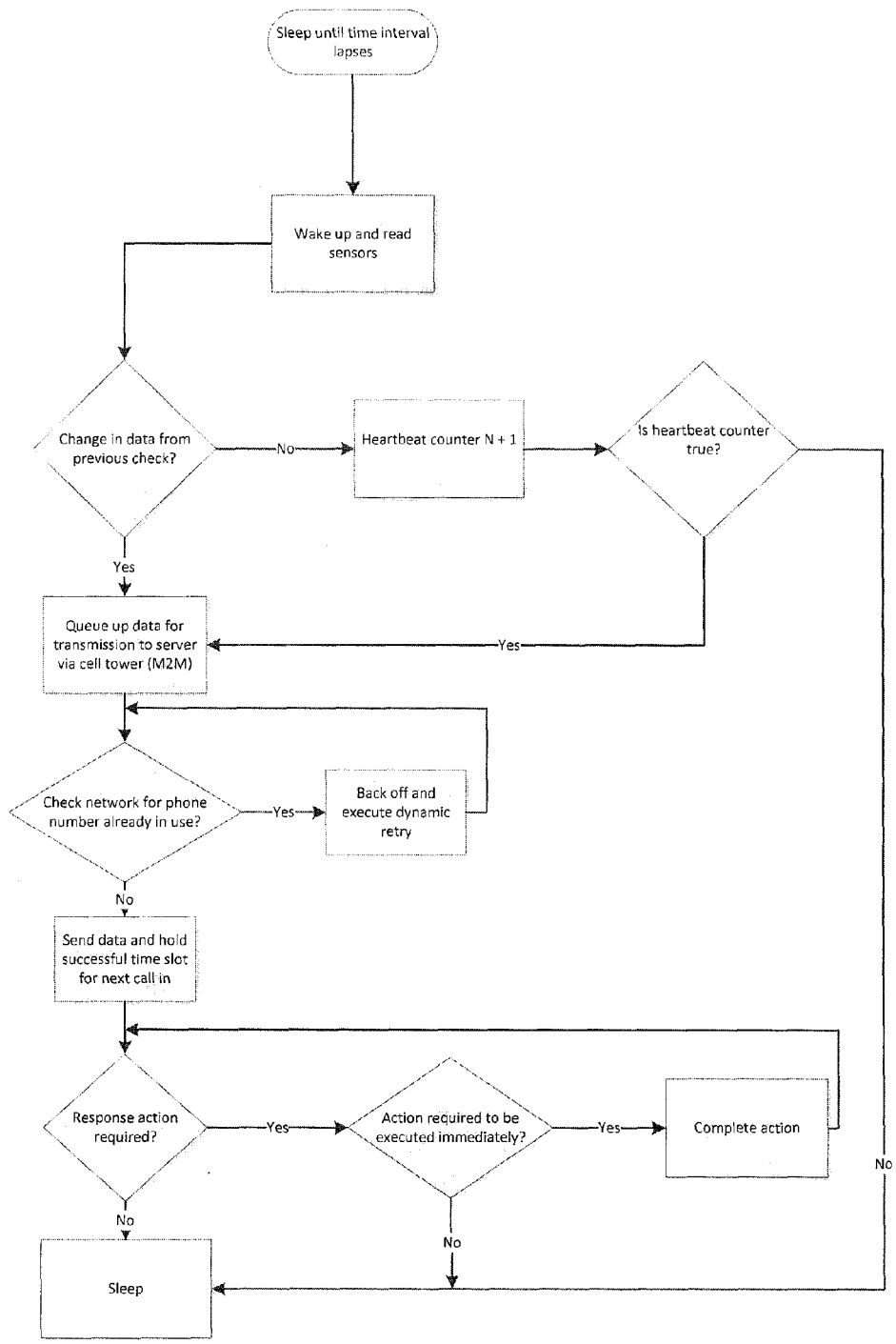
FIG. 2 is a flow chart representing the communication method according to the present invention.

With reference to FIG. 2, in operation, each controller 16 is arranged to periodically sample data from the respective sensors associated therewith corresponding to sensed attributes of the asset. The sensed attributes are compared to notification criteria stored on the controller to determine if a notification or reporting condition exists. If the criterion is met, then communication between the respective asset and the central server over the cellular network is initiated by the controller. If the initial attempt to communicate with the network is busy due to another asset having the same IMSI number already communicating over the cellular network, then the controller reschedules a later time to attempt another communication with the server over the cellular network.

If a successful connection is made, the timeslot corresponding to the successful connection is recorded and stored in the memory of the controller so that when subsequently initiating communication with the server at the next periodic interval the controller will initially attempt connection at the stored timeslot.

Once a successful connection is made, the server identifies the transceiver according to any one of the transceiver identification, the asset identification, the sensor identifications, or the unique ICCID in communication with the transceiver. Once the identification is made, the central server checks for any queued data intended to be sent to the particular controller by the server. Any such data is then sent and appropriate actions are taken by the controller as required by the data being sent. The data being sent may include a replacement notification criterion, new programming instructions regarding the periodic interval duration between communication attempts, or other actions such as actuating a control feature such as a fan in the instance of a grain bin for example. Once all actions have been completed or scheduled for completion, the cycle of the controller is complete and the controller will go into a sleep mode until the next periodic interval.

In the alternative, if no notification criterion is met by the sampled sensed attributes, the controller adds a count to a cycle counter or heartbeat counter of the controller. The controller is also programmed such that if the notification criterion is not met for a prescribed number of cycles, communication of the controller with the server is still initiated by the controller to confirm operational status of the controller as well as to check for any queued data on the server designated with that particular controller.

In the alternative, when it is desired to communicate data from the central server to the controller of one of the assets, the data is queued within the central server and the server simply waits for one of the periodic connections initiated by the controller. When one of the connecting controllers has an identification which is verified to correspond with the queued data, as verified by sensor identification, asset identification, transceiver identification, or ICCID, or any combination thereof, then the queued information is then sent over the cellular network. Either one or both of the transceiver and the central server may be arranged to disconnect the connection upon confirmation that all required communications have been completed.

Since various modifications can be made in my invention as herein above described, it is intended that all matter contained in the accompanying specification shall be interpreted as illustrative only and not in a limiting sense.

The invention claimed is:

1. A method of communicating between a central server and a plurality of assets over a cellular network in communication with the central server, the method comprising:
   i) providing each asset with a transceiver arranged to communicate with the cellular network in which each transceiver includes an integrated circuit card identifier and an international mobile subscriber identity such that:
      a) the integrated circuit card identifier of each transceiver is unique; and
      b) the international mobile subscriber identity of at least two transceivers are in common with one another; and
   ii) for each asset, using the transceiver of the asset, periodically initiating communication between the asset and the central server over the cellular network, and transmitting the integrated circuit card identifier of the asset to the central server upon successful connection between the asset and the central server over the cellular network;
   iii) upon successful connection between one of said at least two transceivers having the same international mobile subscriber identity and the central server over the cellular network, distinguishing which one of said at least two transceivers is connected to the central server using the integrated circuit card identifier that was transmitted to the central server from the transceiver.

2. The method according to claim 1 further comprising providing each transceiver with a unique transceiver identification and identifying the transceiver with the central server using the unique transceiver identification upon successful connection between the transceiver and the central server over the cellular network.

3. The method according to claim 1 further comprising rescheduling a subsequent attempt to initiate Communication between at least one of the assets and the central server over the cellular network in response to a failed connection resulting from the transceiver of another one of the assets having the same international mobile subscriber identities already being in communication over the cellular network.

4. The method according to claim 1 further comprising, in response to a successful connection of one of the assets with the central server over the cellular network, storing a connection time slot associated with the successful connection in a memory of the transceiver of that asset for use in scheduling subsequent attempts to communicate with the central server over the cellular network.

5. The method according to claim 1 further comprising communicating data from the central server to the transceiver of one of the assets by i) queuing said data at the central server until communication between the transceiver of said one of the assets with the central server is initiated by the transceiver, and ii) sending said data to said one of the assets once the unique integrated circuit card identifier of the transceiver has been verified.

6. The method according to claim 1 further comprising using the transceiver to periodically sample data associated with the asset, comparing the sampled data with notification criterion, and using the transceiver to initiate communication with the central server in response to the notification criterion being met.

7. The method according to claim 6 further comprising using the transceiver to initiate communication with the central server in response to a prescribed number of sampling cycles in which the sampled data does not meet the notification criterion.

8. The method according to claim 1 wherein the international mobile subscriber identity of all of the transceivers are in common with one another.

9. A communication system for communicating with a plurality of assets over a cellular network, the system comprising:
   a central server in communication with the cellular network;
   a cellular transceiver associated with each asset and arranged to periodically, initiate communication between the asset and the central server over the cellular network, each cellular transceiver having an integrated circuit card identifier and an international mobile subscriber identity;
   the integrated circuit card identifier of each transceiver being unique;
   the international mobile subscriber identity of at least two transceivers being identical to one another;
   the central server comprising a memory having the integrated circuit card identifier of each transceiver and programming stored thereon so as to be arranged to, upon successful connection over the cellular network with one of said at least two transceivers with identical international mobile subscriber identities, i) receive the integrated circuit card identifier from the connected transceiver, ii) distinguish which one of said at least two transceivers is connected to the central server using the integrated circuit card identifier that was transmitted to the central server from the transceiver.

10. The system according to claim 9 wherein the central server comprises:
    a unique asset identifier stored on the memory in association with each asset; and a processor programmed to identify each transceiver according to either one of the integrated circuit card identifier of said transceiver or the asset identifier of the asset associated with said transceiver upon a successful connection between said transceiver and the central server over the cellular network initiated by said transceiver.

11. The system according to claim 9 wherein the programming stored on the memory is arranged to reschedule a subsequent attempt to initiate communication between said at least one of the assets and the central server over the cellular network in response to a failed connection resulting from the transceiver of another one of the assets having the same international mobile subscriber identities already being in communication over the cellular network.

12. The system according to claim 9 wherein the programming stored on the memory is arranged, in response to a successful connection of said at least one of the assets with the central server over the cellular network, to store a connection time slot associated with the successful connection in a memory of the transceiver of said at least one of the assets for use in scheduling subsequent attempts to communicate with the central server over the cellular network.

13. The system according to claim 9 wherein the programming stored on the memory is arranged to communicate data from the central server to the transceiver of one of the assets by i) queuing said data at the central server until communication between the transceiver of said one of the assets with the central server is initiated by the transceiver, and ii) sending said data to said one of the assets once the unique integrated circuit card identifier of the transceiver has been verified.

14. The system according to claim 9 wherein the programming stored on the memory is arranged to use the transceiver to periodically sample data associated with the asset, to compare the sampled data with notification criterion, and to use the transceiver to initiate communication with the central server in response to the notification criterion being met.

15. The system according to claim 14 wherein the programming stored on the central server is further arranged to use the transceiver to initiate communication with the central server in response to a prescribed number of sampling cycles in which the sampled data does not meet the notification criterion.

16. The system according to claim 9 wherein the international mobile subscriber identity of all of the transceivers are identical to one another.

17. A communication system for communicating with a plurality of assets over a cellular network, the system comprising:

a central server in communication with the cellular network;

a cellular transceiver associated with each asset and arranged to communicate between the asset and the central server over the cellular network, each cellular transceiver having an integrated circuit card identifier and an international mobile subscriber identity;

the integrated circuit card identifier of each transceiver being unique;

the international mobile subscriber identity of at least two transceivers being identical to one another;

wherein the central server comprises a memory and programming stored thereon so as to be arranged i) to use the transceiver to periodically sample data associated with the asset, ii) to compare the sampled data with notification criterion, iii) to use the transceiver to initiate communication with the central server in response to the notification criterion being met, and iii) to use the transceiver to initiate communication with the central server in response to a prescribed number of sampling cycles in which the sampled data does not meet the notification criterion.

* * * * *